United States Patent [19]

Riedel

[11] 3,996,629

[45] Dec. 14, 1976

[54] DEMAND TYPE FLUSH TANK CONTROL

[76] Inventor: Rudolph T. Riedel, 7198 Sugarbin St., Orlando, Fla. 32807

[22] Filed: Sept. 2, 1975

[21] Appl. No.: 609,306

Related U.S. Application Data

[63] Continuation-in-part of Ser. No. 519,183, Oct. 30, 1974, abandoned.

[52] U.S. Cl. .................................................. 4/67 R
[51] Int. Cl.² ........................................ E03D 3/12
[58] Field of Search .................. 4/67 A, 67 R, 57 P, 4/57 R, 34, 37, 249

[56] References Cited

UNITED STATES PATENTS

| | | | |
|---|---|---|---|
| 2,502,065 | 3/1950 | Shobe | 4/67 R X |
| 2,518,679 | 8/1950 | Graham | 4/67 R X |
| 2,549,700 | 4/1951 | Minton | 4/67 R X |
| 2,628,362 | 2/1953 | Birkmaier | 4/67 R X |
| 2,713,687 | 7/1955 | Bill et al. | 4/57 R |
| 2,895,141 | 7/1959 | Curran | 4/57 R |
| 2,940,084 | 6/1960 | Fabbi et al. | 4/57 P |
| 3,181,177 | 5/1965 | Marshall | 4/57 R |
| 3,339,211 | 9/1967 | Wills | 4/57 R X |

*Primary Examiner*—Henry K. Artis
*Attorney, Agent, or Firm*—Julian C. Renfro

[57] ABSTRACT

A demand type flush tank control for saving water by controlling and limiting the motion of the water release valve of the water storage tank of a toilet, such that the water release valve can be moved only a sufficient distance to bring about the amount of flushing action required in a given instance, thus preventing the entire content of the tank from being used except if actually needed. My novel control or restraint type device prevents a bulb type water release valve from becoming free floating, but rather compels it to reside closely beside its seat during a flushing operation, or in the case of a flapper type valve, my restraint serves to limit its movement. These advantages may be accomplished by the use of a restraint device involving either a one piece or a multipiece construction. As should be apparent, the operative position, in accordance with this invention, for either the bulb type or the flapper type water release valve is such that it readily returns to its seat as soon as the toilet handle is released, thereby effecting a daily savings of many gallons of water.

19 Claims, 7 Drawing Figures

DEMAND TYPE FLUSH TANK CONTROL

RELATIONSHIP TO PREVIOUS INVENTIONS

This invention bears a definite relationship to my U.S. Pat. No. 3,719,957, which issued Mar. 13, 1973, and is a continuation-in-part of my application Ser. No. 519,183, filed Oct. 30, 1974 now abandoned.

BACKGROUND OF THE INVENTION

This invention relates to a flush tank control arrangement for a toilet such that only that volume of water actually required for accomplishing the flushing of a toilet in a given instance need be utilized.

In the past, other devices have been proposed for limiting the flow of water from the water storage tank of the toilet, but many of these have been complex and expensive devices, requiring installation by a professional. Such devices have included arrangements involving the use of primary and secondary floats and accompanying linkages, as well as arrangements in which the handle of the tank must be substantially modified.

My U.S. Pat. No. 3,719,957 represented a substantial improvement over the devices of the prior art in that it made it possible to limit the amount of water released without involving any costly modifications. On the other hand, however, the device in accordance with my previous patent could not fully control certain types of water release valves, and furthermore it was susceptible to unauthorized removal when utilized in public places.

SUMMARY OF THIS INVENTION

The present invention involves a device designed to update present day, water wasting toilets and represents a substantial improvement thereover in that it is a control or restraint directly associated with the water release valve. In its simplest form, my novel restraint takes the form of a one-piece device fastened at an appropriate location on the vertically disposed overflow pipe of the toilet, being secured in such position by a single nut and bolt, thus making it easily possible for the user to mount the active portion of my novel restraint directly over the water release valve. Height adjustments as well as rotational adjustments can thus be made very simply and easily.

The active portion of the restraint or control device typically involves a pair of elongate arms mounted in spaced relation, with the linkage or chain utilized for raising the water release valve residing approximately midway between these arms.

The advantageous construction in accordance with this invention is such that it can be easily utilized with various types of water release valves, including bulb type valves as well as flapper type valves, and quite obviously can be installed by an amateur without the use of tools and without in any way damaging the toilet.

It is therefore a primary object of this invention to provide an easily installed, inexpensive control or restraint device for minimizing the amount of water expended in the flushing of a toilet, thereby effecting a substantial conservation of water.

It is another object of my invention to provide a restraint or control device that can be quickly and easily mounted without damage upon the overflow pipe of a water storage tank of an existing toilet, thus to limit the amount of motion that can be undertaken by a water release valve during a flushing operation.

It is yet another object of this invention to provide a control or restraint device that can be easily mounted on an interior portion of a toilet, which can function to minimize the amount of water expended during a flushing operating, while at all times being adjustable so that the amount of water released can be carefully controlled.

It is still another object of my invention to provide a highly effective restraint involving a minimum of parts and components.

It is still another object of my invention to provide a highly effective restraint for use in a toilet to minimize the wasting of water, which device will not rust, and which can be installed by an amateur using no tools of any kind.

These and other objects, features and advantages will become more apparent from an inspection of the appended drawings in which.

DETAILED DESCRIPTION

Figure 1:
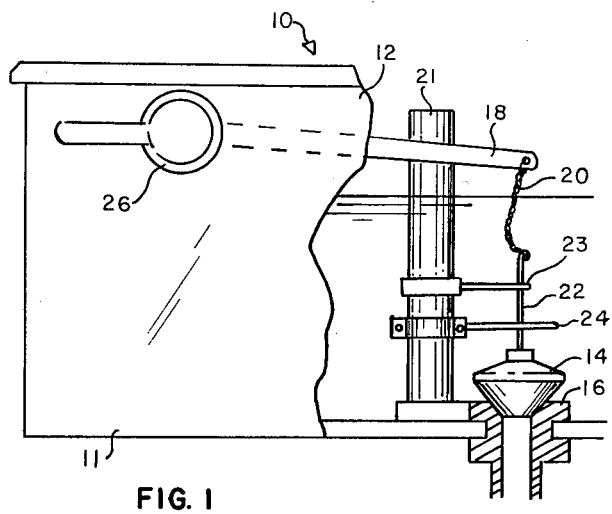
FIG. 1 is a side elevational view of a typical toilet tank arrangement, with a portion of the tank sidewall being removed so as to make visible the placement of my novel control or restraint means above the ball type water release valve.

Turning now to FIG. 1, it is to be seen that I have illustrated a typical flush tank arrangement 10 of the general kind associated with the type of toilet utilizing a water storage tank 11. Water from this tank is of course released by the user's manipulation of the handle 26, which serves to bring about a movement of the water release valve 14 from the valve seat 16.

Figure 2:
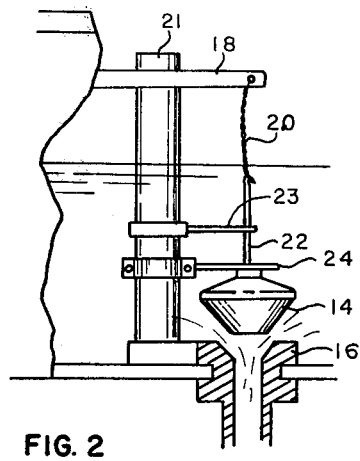
FIG. 2 is a fragmentary view relatable to FIG. 1 but showing the water release valve in a raised position in which it contacts the restraint means, thus to allow the water contained in the tank to flow into the bowl under the close control of the operator of the handle.

The sidewall 12 of the tank is cut away to reveal the presence of an arm 18 attached to the handle 26, with the arrangement being such that the pressing down the handle causes the arm 18 to raise. The linkage 20 attached near the remote end of the arm connects with the valve rod 22, thus enabling the valve to be lifted away from the seat 16 when the handle is manipulated to raise the arm 18. As depicted in FIG. 2, this motion of the valve 14 permits the release of water from the tank 11 so that it can flow into the bowl (not shown) of the toilet.

Standard toilet construction involves a vertically disposed overflow tube 21 which is affixed near the valve seat 16, this overflow tube typically made of copper and being 9½ inches long and one inch in diameter. In many toilets, the overflow tube is equipped with threads disposed about its lower portion, which threads are arranged to engage female threads of a fitting in the bottom of the tank, which fitting is usually common to the member in which the valve seat 16 is located. However, the foregoing is merely exemplary, and I am not to be limited thereto. A rod guide 23 is mounted on the tube 21 to guide the movements of the rod 22 and therefore the valve 14.

In accordance with this embodiment of my invention, I utilize a restraint member or device 24, which typically is installed on the overflow pipe adjacent the rod guide 23. My novel restraint device involves a clamping portion to be removably secured below the rod guide 23, and a restraint portion extending in the immediate vicinity of the water release valve. The clamping portion can involve a pair of collar members, described hereinafter, and the restraint portion can be a pair of essentially parallel arms, with one arm being integral with each collar half. However, in the preferred embodiment, discussed hereinafter, the clamping and restraint portions are of one-piece construction.

In the conventional flush tank arrangement, the manipulation of the handle 26 in the usual manner causes the water release valve 14 to move upwardly against the underside of rod guide 23, and to be sustained by the water in a position a substantial distance above the seat 16 in what may be regarded as a free floating position, until such time as the water level drops considerably. Then, the valve 14 floats down with the water level as the tank empties, and ultimately moves into sealing contact with the seat 16. Approximately five gallons of water are normally expended in this manner. It is the purpose of this invention to cut down on such amounts of water, except if such quantity is actually needed, such as for the removal of solid wastes.

Figure 5:
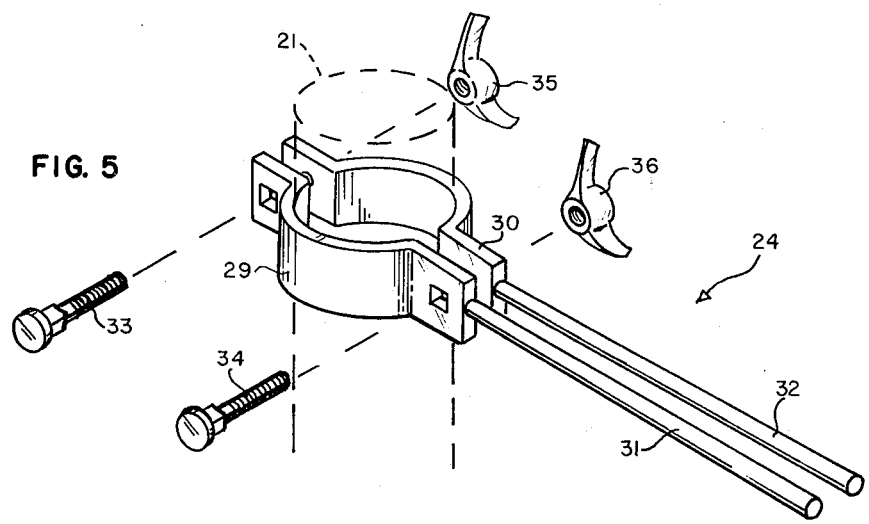
FIG. 5 is a fragmentary view, to a larger scale, of a multipiece form of my novel restraint means, with portions of this view being shown in exploded relation.

Reference to FIG. 5 reveals that a multipiece embodiment of my novel restraint device 24 involves a pair of curved collar members 29 and 30, each of which possesses a curvature similar to and compatible with the configuration of the generally cylindrical overflow pipe 21. Typically, the two collar halves are of identical construction, each half having a pair of mounting holes. As will be noted from this figure, when one collar member is placed on each side of the overflow pipe, the holes in the collar members line up. By placing a bolt of proper length in each pair of aligned holes and threading nuts over these bolts after the collars have been placed in the proper position on the pipe and placed in assembled relation to each other, the collar members can be tightly clamped in the desired position to the overflow pipes, thus serving as the clamping means. I deliberately construct each curved collar member to extend less than 180° around the pipe, so that the portions in which the mounting holes are located do not touch each other, thus making it possible for the bolts to be tightened properly. The bolts 33 and 34 are equipped with wing nuts 35 and 36, as shown in FIG. 5, thus making it possible for my device to be installed in a minimum of time without tools.

Extending away from collar members 29 and 30 are protuberances or arms 31 and 32, respectively, with each arm being of cantilevered construction and several inches long. Inasmuch as the collar members, as indicated above, are identical in construction, likewise the arms or protuberances are typically of identical length, which length is sufficient that they can straddle the rod 22 and extend over the central portion of the water release valve when the respective collar members have been secured to the overflow tube 21. Although many arrangements within the spirit of this invention could obviously be used, I prefer for the collar members to be sized and configured such that when the bolts have been fully tightened, the arms will be essentially parallel and spaced one inch to 1½ inches apart. The distance the arms are caused to be disposed above the upper part of the valve 14 may vary in accordance with the rate at which it is desired that water escape from the tank 11, but typically it is less than 2 inches.

As will be quickly apparent to one skilled in the art, it is not the intent of my restraint device to prevent the motion of the release valve 14 entirely, but rather to limit the motion of this valve such that flushing of the toilet can be accomplished with a substantial saving of water. To this end I arrange the device such that when the toilet handle 26 has been manipulated somewhat in the flushing direction as shown in FIG. 2, the upper portion of the valve 14 will contact the underside of the arms 31 and 32, and therefore prevent the valve from being moved more than a limited distance, which is nevertheless sufficient to enable the toilet to be flushed. By virtue of this arrangement, the water release valve 14 is prevented from moving into contact with the rod guide 23 and becoming free floating, thus effectuating a substantial saving in water. This is because when the user releases the handle 26 from a position of limited valve movement, the water release valve descends quickly to its seat, thus causing an almost immediate cessation of the flow of water from the tank.

It has been found that in most instances when a toilet is being flushed, it is being operated to get rid of substantially liquid waste, in which instance it is necessary to hold the handle in the position of limited valve movement shown in FIG. 2 only a comparatively short amount of time. Thus, when such waste has been eliminated or neutralized, the user can then release the handle and allow the water release valve to return to the position shown in FIG. 1. Since the water release valve seats almost immediately, the amount of water utilized in such an instance typically is two quarts. At this time, the refilling of the tank will be brought about quickly, and in the usual manner.

When, however, solid wastes are being eliminated, it will be necessary to hold the handle in the depressed position of limited movement shown in FIG. 2 for a greater length of time, but it is important to note that even in this instance, the solid waste will be carried away with less water usage than in a regular flush, where the water release valve 14 was allowed to become free floating. This saving is estimated to be about one-half a tank, or approximately 2½ gallons of water.

Figure 3:
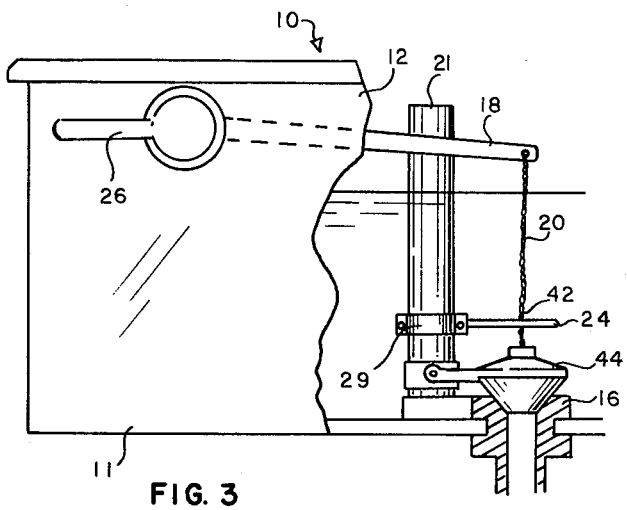
FIG. 3 is a side elevational view of another toilet tank arrangement, with a portion of the tank sidewall removed in order to show my novel restraint means utilized with a flapper type water release valve.
Figure 4:
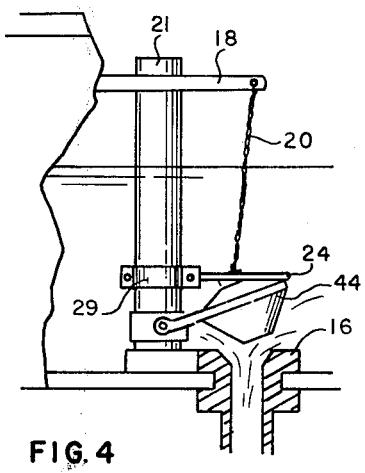
FIG. 4 is a view relatable to FIG. 3, but showing the flapper type water release valve in the position permitting the escape of water from the tank at only a limited rate.

Referring to FIGS. 3 and 4, it will be noted that I have shown my novel restraint device 24 utilized in a toilet tank in which a flapper valve 44 is used. As before, the restraint is secured, such as by the use of a pair of bolts, upon a lower portion of the overflow tube 21, but instead of the restraint arms straddling a rod 22 associated with a ball type valve, they instead straddle the linkage 42 associated with the flapper valve 44.

As shown in FIG. 4, the presence of the arms of the restraint 24 a limited distance above the flapper valve 44 inhibits the pivotal movement of this valve about its mounting means, thus limiting the rate at which water is allowed to escape from the tank into the toilet bowl. As should be obvious, by loosening the bolts 33 and 34, changing the height of the restraint, and thereafter retightening the bolts a time or two subsequent to the installation of the restraint, the user can establish the best flow and control position, or in other words, the most appropriate rate of escape of the water for his or her circumstances.

Although a number of rust proof metallic materials could be used, such as copper or the like, I prefer to use a suitable plastic in the fabrication of the collar and arm members, and in the construction of the bolts and wing nuts. Various high impact plastics are suitable, such as lexan, but in addition, nylon and many other synthetic materials of this type could also be used.

By using bolts in the nature of carriage bolts, with square shoulders beneath the heads, and using square holes of the appropriate size in the collar members, the bolts can be restrained against turning as the wing nuts are being tightened, thus simplifying the installation procedure.

Figure 6:
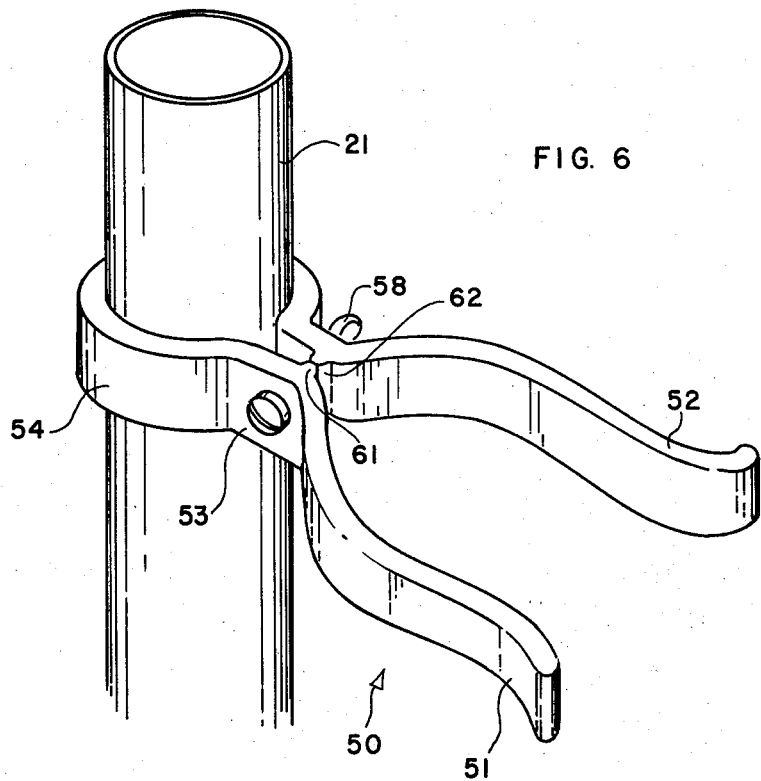
FIG. 6 is a perspective view of a preferred, one-piece embodiment, disposed on an overflow tube.

Turning now to FIG. 6, it will there be seen that I have provided a single piece embodiment 50 of my invention. This device is configured to provide a pair of widely-spaced yet essentially parallel arms 51 and 52, which are affixed to a closed loop portion 54 that is designed to closely surround the overflow tube 21. The arms are arranged to extend essentially prependicularly to the tube 21, with the spacing of the arms 51 and 52 being appropriate for restraining in a desirable manner, the upward movement of either a ball 14 or flapper 44 as shown in the previous figures, at such time as the handle 26 is manipulated. I have found it preferable for the arms to be from 1⅝ to 1¾ apart, so that they can act against the apron of the bulb, but I am not to be so limited.

Figure 7:
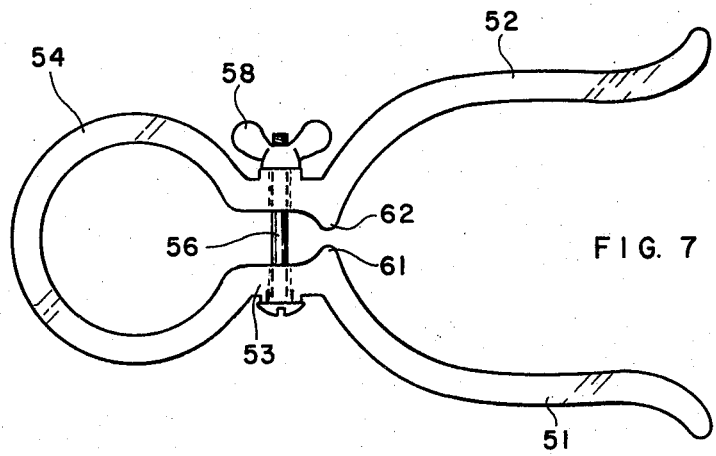
FIG. 7 is a top view of the single piece embodiment.

Reference to FIG. 7 further reveals with respect to this one-piece component, that suitable holes are provided in a midportion 53 located between the loop and the arms, with a bolt 56 extending through the holes. As also revealed in FIG. 7, one end of this bolt may be equipped with a screwdriver slot, whereas a wing nut 58 is threadly disposed on the opposite end of the bolt 56.

Further study of the configuration presented in FIG. 7 reveals small protuberances 61 and 62 provided on the inner portions of the arms in the vicinity of the midportion 53. These protuberances are normally spaced somewhat apart, such as when the device is being inserted over the overflow tube 21.

The bolt 56 is of course nearer to the closed loop 54 than are the protuberances, and upon the wing nut 58 being tightened, the interior portion of the closed loop tends to bear tightly against the sidewall of the overflow tube 21, holding the outwardly-extending arms in the desired relation to the water release valve.

As a result of this construction, upon the closed loop portion 54 of the device 50 being positioned on the overflow tube at a location in which the arms bear a desired relationship to the ball or flapper being utilized, the wing nut is then tightened by the thumb and fingers so as to cause the loop portion not to slip with respect to the sidewall of the overflow tube. The protuberances 60 and 62 assure the device maintaining the proper configuration during the tightening procedure, so as to prevent the restraint arms from being brought too close together.

As will be apparent, the single piece embodiment of FIGS. 6 and 7 is of economical construction, yet is highly effective for the purpose intended. Obviously, any of several different materials may be used, but I prefer to form the device 50 from a single piece of suitable plastic. By utilizing a carriage bolt, with a square shoulder beneath its head, and a square hole in one side of the midportion 53, the bolt is restrained against turning as the wing nut is tightened, thus making the use of a screwdriver or any other tool completely unnecessary.

I claim:

1. A demand type restraint device for preventing the utilization of an unnecessary amount of water in the flushing of a toilet of the type having a water storage tank, a handle movable to bring about a lifting of the water release valve from its seat to accomplish a flushing of the toilet, and an overflow pipe mounted near the valve seat, said device comprising a clamping portion and a restraint portion, said clamping portion being of a construction such that it can be removably secured to overflow pipes of various sizes, with said restraint portion comprising a pair of spaced apart, relatively adjustable arms extending in the path of travel of the water release valve and serving to restrict the upward movement of the water release valve to some extent when the handle is manipulated, said restraint portion allowing said water release valve to move away from its seat during handle manipulation for a sufficient amount that some of the water in the tank can be utilized in flushing the toilet, said restraint portion directly contacting said water release valve at a location lower than the point at which the flow of water would continue after the handle has been released.

2. The device as defined in claim 1 in which said restraint portion involves a pair of arms that straddle the mechanism used to lift the water release valve, said clamping portion enabling the height location of said restraint portion with respect to the water release valve to be adjusted so that a desirable amount of water is released each time the handle of the toilet is manipulated for a given length of time.

3. The device as defined in claim 2 in which said pair of arms are formed from a single piece of material.

4. The device as defined in claim 2 in which said pair of arms are separate, with each arm being integral with a respective part of said clamping portion.

5. The device as defined in claim 1 in which the water release valve is of the bulb type, which normally becomes free floating each time the handle of the toilet is manipulated, but which bulb is prevented by said restraint portion from becoming free floating.

6. The device as defined in claim 1 in which the water release valve is of the flapper type, being movable about a hinge point, said restraint portion preventing a comparatively unrestricted movement of the valve about its hinge point, thus making it necessary to hold the handle in the manipulated position in order to keep the valve from returning to its seat.

7. A demand type flush tank control device for preventing the utilization of an unnecessary amount of water in the flushing of a toilet of the type having a water storage tank, a handle movable to bring about a lifting of the water release valve from its seat to accomplish a flushing of the toilet, and an overflow pipe, said device comprising a clamping portion of a construction such that it can be removably secured to overflow pipes of various sizes, and a pair of arms extending outwardly in spaced relation from said clamping portion in the path of travel of the water release valve and serving by physical contact with the water release valve to restrict its upward movement when the handle is manipulated, said arms allowing the water release valve to move away from its seat during handle manipulation for a sufficient amount that some of the water in the tank can be utilized in flushing the toilet, said arms directly contacting the water release valve at a location lower than one at which the flow of water can continue after the handle has been released.

8. The device as defined in claim 7 in which said arms are essentially parallel, and are caused to reside an approximately equal distance above the upper surface of the water release valve.

9. The device as defined in claim 7 in which said arms as well as said clamping portion are of one-piece construction.

10. The device as defined in claim 7 in which said arms are separate from each other, with each arm being integral with a respective part of said clamping portion.

11. The device as defined in claim 7 in which said clamping portion enables the height location of said pair of arms with respect to the water release valve to be adjusted so that a desirable amount of water is released such time the handle of the toilet is manipulated for a given length of time.

12. The device as defined in claim 7 in which the water release valve is of the bulb type, which normally becomes free floating each time the handle of the toilet is manipulated, but which bulb is prevented by said arms from becoming free floating.

13. The device as defined in claim 7 in which the water release valve is of the flapper type, being movable about a hinge point, said arms preventing a comparatively unrestricted movement of the valve about its hinge point, thus making it necessary to hold the handle in the manipulated position in order to keep the valve from returning to its seat.

14. A restraint device for installation on the overflow pipe of a toilet tank equipped with a handle in order to prevent the water release valve of the toilet tank from moving far from its seat during the flushing of the toilet, comprising a pair of curved collar members, each of said collar members being of a size and curvature such as to engage a toilet overflow pipe, each of said collar members having an elongate arm extending therefrom, tightening means for securing said collar members together so as on occasion to cause said collar members to grip an overflow pipe at a desired location, the arms of said collar members, when said collar members have been secured to the overflow pipe, being disposed in essentially parallel relation and spaced slightly apart so as to permit motion therebetween of members associated with the lifting of the water release valve, said arms, when positioned properly on the overflow pipe, serving to prevent the water release valve from moving far off its seat, and thus causing an immediate return of the water release valve to its seat as soon as the handle is released.

15. The restraint device as defined in claim 14 in which each arm is integral with its respective collar member, with each arm-collar component being substantially identical to the other one used therewith.

16. The restraint device as defined in claim 14 in which said tightening means is in the form of a pair of bolts extending between said collar members, with wing nuts being utilized in connection with said bolts in order that said collar members can be tightened upon the overflow pipe.

17. The restraint device as defined in claim 16 in which all components are of plastic.

18. A demand type control device for preventing the utilization of an unnecessary amount of water in the flushing of a toilet of the type having a water storage tank, a handle movable to bring about the lifting of the water release valve from its seat in order to accomplish a flushing of the toilet, and an overflow pipe, said control device comprising a clamping portion adapted to being secured to various sizes of overflow pipes, and a control portion residing in the path of travel of the water release valve, said control portion comprising a pair of arms, extending outwardly in spaced relation, and securing means disposed between said clamping portion and said control portion, said securing means, when tightened, serving the simultaneous purposes of securing the device at a selected height on the overflow pipe as well as serving to establish the distance apart of said pair of extending arms, said adjustable control portion permitting the water release valve to move away from its seat during handle mainpulation for a sufficient amount so that some of the water in the tank can be utilized in flushing the toilet, but serving, by direct contact with the water release valve, to restrict its upward travel to a point below which the valve could become free floating.

19. The demand type control device as defined in claim 18 in which said one piece device is of plastic, and said securing means is a single nut and bolt combination.

* * * * *